(12) United States Patent
Wilson et al.

(10) Patent No.: US 6,590,733 B1
(45) Date of Patent: Jul. 8, 2003

(54) DIGITAL PROCESSING OF PILOT-TONE AMPLITUDES

(75) Inventors: Rosser S. Wilson, Menlo Park, CA (US); Michael R. Spaur, Irvine, CA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/474,175

(22) Filed: Dec. 29, 1999

Related U.S. Application Data
(60) Provisional application No. 60/150,081, filed on Aug. 20, 1999.

(51) Int. Cl.[7] ............................................. G11B 5/596
(52) U.S. Cl. ........................ 360/77.14; 386/14; 386/88
(58) Field of Search ........................ 360/77.14; 386/14, 386/18, 86–88

(56) References Cited

U.S. PATENT DOCUMENTS 5,060,092 A    10/1991   van der Kop ............. 360/77.14
5,875,065 A  *  2/1999   Shimura ................... 360/77.14

OTHER PUBLICATIONS

"An Experimental Digital Consumer Recorder For MPEG–Coded Video Signals" by Saeijs, et al, *Transactions On Consumer Electronics*, vol. 41, No. 3, pp 651–660, Aug. 1995.

"DVS Full–Digital VTR Servo Interface" by Motorola Semiconductor.

"Channel Code With Embedded Pilot Tracking Tones for DVCR" by Kahlman et al., *Transactions on Consumer Electronics*, vol. 41, No. 1, pp 180–185, Feb. 1995.

"Computer Arithmetic Principles, Architecture and Design" by Hwang, *School of Electrical Engineering, Purdue University*, pp 359–365.

* cited by examiner

*Primary Examiner*—David Hudspeth
*Assistant Examiner*—Mitchell Slaviti
(74) *Attorney, Agent, or Firm*—Kinney & Lange, P.A.

(57) ABSTRACT

In a system having an input signal set with at least two signals having mutually exclusive frequencies f1 and f2 being part of the input signal set, whose amplitude is represented in an input digital representation, the amplitudes of each of the at least two signals are digitally represented. A digital representation of the frequency of each of the signals is derived. A digital representation of the sine function and of the cosine function of the frequency of each of the signals is derived based on the digital representation of the frequency. The digital representations of each of the sine and cosine functions is mixed with the input digital representation to derive digital representations of the sine and cosine functions of each of the signals. The digital representations of the sine and cosine functions of each of the signals are processed to derive a digital representation of the amplitude of each of the signals.

26 Claims, 8 Drawing Sheets

DIGITAL PROCESSING OF PILOT-TONE AMPLITUDES

CROSS-REFERENCE TO RELATED APPLICATION(S)

This application claims the benefit of U.S. Provisional Application No. 60/150,081 filed Aug. 20, 1999 for "Digital Detection Method for Pilot-Tone Servo" by Rosser S. Wilson and Michael R. Spauer.

BACKGROUND OF THE INVENTION

This invention relates to servo positioning the read heads of a video cassette recorder (VCR), and particularly to detecting pilot-tones from adjacent tracks or stripes and digitally processing pilot-tone information for centering the head on the track being followed.

Video cassette recorders record audio and video signals in stripes across the width of the tape, the stripes being arranged in parallel at an incline to the direction of the tape travel. As illustrated in FIG. 1, the stripes are recorded such that every other stripe along the length of the tape contains information modulated to produce a tone at either of two pilot-tone frequencies, f1 and f2. The f0 stripes are interleaved between the f1 and f2 stripes such that each f0 stripe is bounded by adjacent f1 and f2 stripes. Each f0 stripe contains specific notches at the f1 and f2 frequencies. Track following occurs only when the head is attempting to track the f0 stripes. As shown in FIG. 1, the head senses the pilot-tones of the adjacent f1 and f2 stripes. The amplitude of each pilot-tone f1 or f2 sensed is largely affected by the position of the head in relation to the f1 and f2 stripes. If the head detects an f1 pilot-tone amplitude greater than an f2 pilot-tone amplitude, the head is off the center of the f0 stripe toward the f1 stripe. Differential averaging techniques are employed to quantify the off-center condition of the head and to operate a servo mechanism based on the f1 and f2 pilot-tone amplitudes to move the head relative to the f0 stripe until the head is centered on the f0 stripe and the f1 and f2 pilot-tone amplitudes are equal.

Prior pilot-tone detection and processing employed analog technology using bandpass filters that pass signal amplitudes centered on the pilot-tone frequencies. The amplitude of each filtered signal was detected and the difference between them was a measure of servo mis-position. The difference signal was ultimately converted to a digital form to operate the servo control microprocessor. However, pilot-tone frequency can vary by as much as ±10% due to variations in tape speed, such as in a "trick" play mode. Therefore, bandpass filters associated with pilot-tone detection necessarily had to be wide enough to accommodate expected frequency variations of the pilot-tones. Wider bandpass filters resulted in a greater likelihood of detection of noise with the pilot tone, resulting in inaccurate amplitude detection of the pilot-tone. Inaccuracies in pilot tone amplitude detection resulted in errors in operating the servo to center the head on the f0 stripe. Moreover, certain servo algorithms cannot process wide bandwidths, making the wide bandpass filters infeasible in some systems. Narrow bandpass filters could be employed but required switching to define the bandwidths of the actual tones, thereby adding to the complexity of the detection and processing of pilot-tones. The present invention is directed to a digital technique for digitally processing the pilot tone frequencies to inaccuracy of less than about 0.5%, over a range of ±10% of the nominal pilot-tone frequency. As a result, pilot-tone amplitude is more accurately detected, resulting in greater accuracy of the head positioning over the f0 stripes, and the quantity of expensive analog circuitry can be reduced.

BRIEF SUMMARY OF THE INVENTION

According to the present invention, the amplitudes of at least two signals having mutually exclusive frequencies are digitally determined from an input digital representation of an input signal set containing the two signals. Digital representations are locally derived representing the nominal frequencies of the two signals, from which digital representations of the sine and cosine functions of each locally derived frequency are derived. The derived digital representations of the sine and cosine functions of each frequency are mixed with the input digital representation to determine a product of the input signal with the sine and cosine functions of each of the locally derived frequencies. The resulting four digital representations are processed to derive digital representations of the amplitudes of each of the two signals.

In one form of the invention, the digital representations of the frequencies are derived by establishing a number representative of the respective frequency and repeatedly advancing a count in an accumulator by the number to establish a digital ramp having a slope representative of the frequency. One accumulator is provided for each frequency f1 and f2. The digital representations of the sine and cosine functions of each of the two locally derived frequencies are stored in a look-up table or an array of look-up tables, and the sine or cosine value is based on an instantaneous value of the count in the accumulator. The sine and cosine functions of each frequency are multiplied with the input signal, and the output of each multiplier is processed in a separate digital low-pass filter to extract the baseband component thereof. The outputs of the low-pass filters processing the sine and cosine functions of frequency f1 are combined in each channel in root-sum-of-squares fashion to yield a signal representative of the amplitude of the f1 component of the input signal. In similar fashion, the outputs of the low-pass filters processing the sine and cosine functions of frequency f2 are combined in root-sum-of-squares to yield a signal representative of the amplitude of the f2 component of the input signal. The signals representative of the amplitudes of f1 and f2 are subtracted and the result is provided in digital form to the servo control microprocessor of the VCR that regulates head position.

Another form of the invention employs time-sharing techniques to derive the digital representations of the sine and cosine functions and to perform the mixing, low-pass filtering and root-sum-of-squares combining operations, thereby achieving significant savings in the hardware volume utilized to implement the invention. The amplitudes of at least two signals having mutually exclusive frequencies are digitally determined from an input digital representation of an input signal set containing the two signals. Digital representations are derived representing the frequencies of the two signals at frequencies f1 and f2. As in the first form of the invention, these representations are obtained by incrementing an accumulator at an appropriate rate for each frequency, and two accumulators are therefore provided. A sine/cosine look-up table, mixer, low-pass filter and root-sum-of-squares combinor are employed sequentially and in pipeline fashion to process the four channels of information representing sine and cosine functions of signals for both frequencies f1 and f2. State memory is employed to store the states associated with each channel.

DETAILED DESCRIPTION

Figure 1:
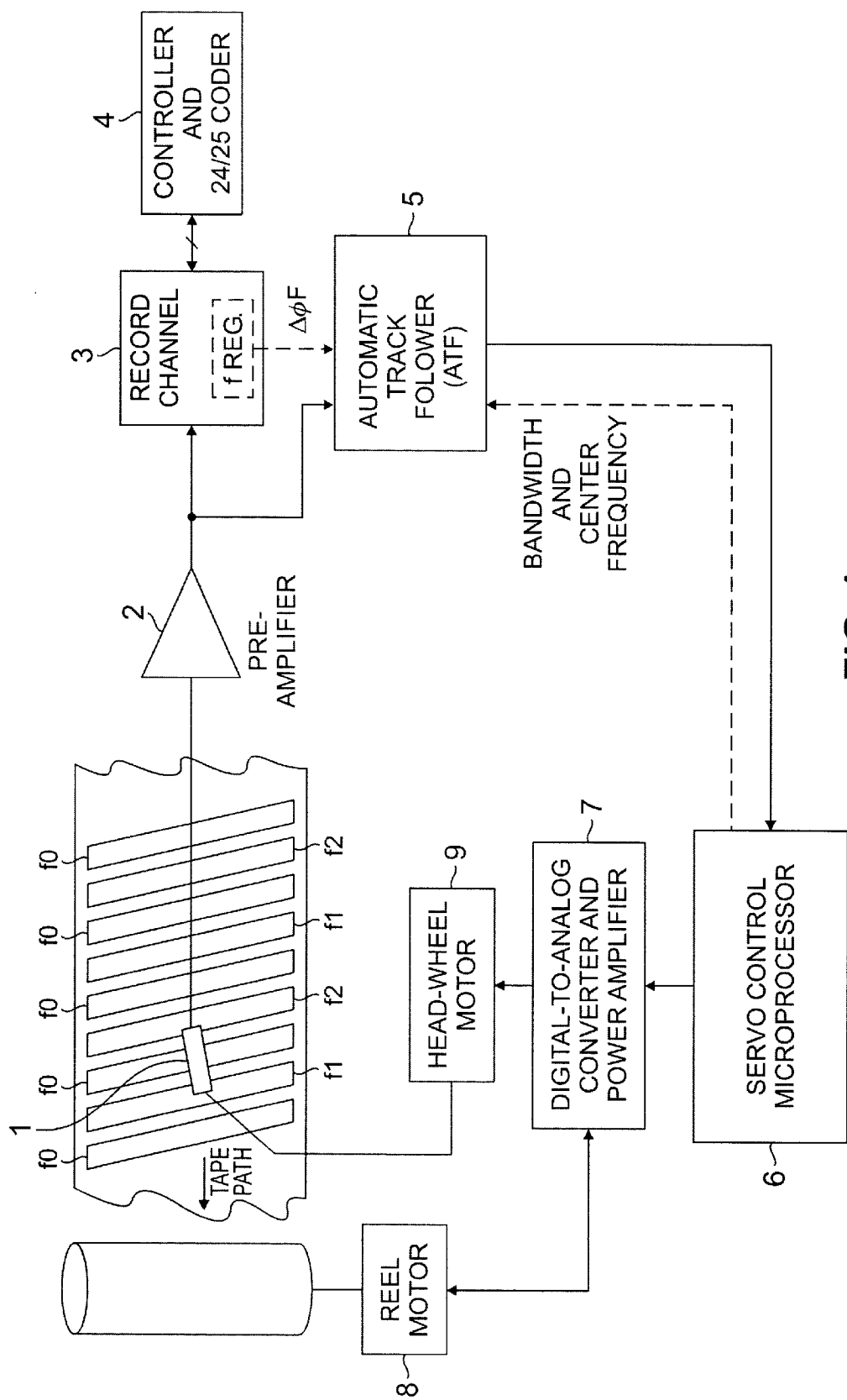
FIG. 1 is a block diagram of a VCR system that also illustrates the layout of stripes along a VCR recording tape.

FIG. 1 is a block diagram of a VCR system within which the present invention is implemented. Head 1 is positioned over an f0 stripe between an f1 stripe and an f2 stripe, and preamplifier 2 is connected to head 1 to amplify analog playback data in a manner known in the art. Record channel 3 decoded the analog playback data and delivers the decoded data to controller 4. The data are coded into 24/25 format as is known in the art, and contain embedded pilot tones and pilot tone notches. Automatic track follower (ATF) 5 also receives playback data provides an indication of the relative amplitude of the f1 and f2 tones to servo control microprocessor 6. Servo control microprocessor 6 utilizes the relative amplitude indications from ATF 5 to control reel motor 8 and head-wheel motor 9 (with signals converted to analog form by digital-to-analog converter and power amplifier 7), thereby causing head 1 to be centered on the f0) stripe of the tape.

Figure 2:
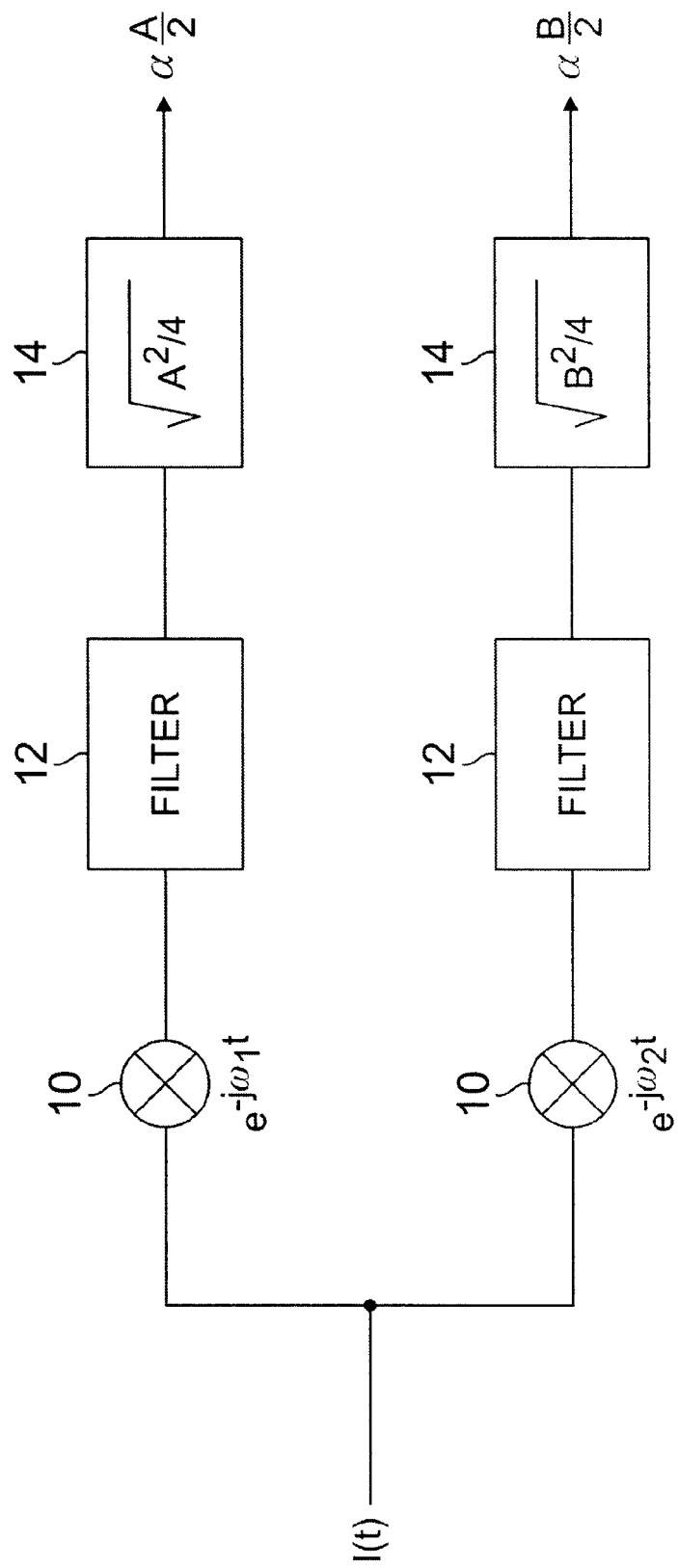
FIG. 2 illustrates the principles of amplitude detection of pilot-tone frequencies according to the present invention.

FIG. 2 illustrates the principles of amplitude detection of pilot-tone frequencies according to the present invention. The input signal I(t) is read by the head (FIG. 1) and is a complex analog signal represented by $$I(t) = A\cos[\omega_1(1+\alpha)t] + B\cos[\omega_2(1+\alpha)t] \quad (1)$$

$$= (A/2)(e^{j\omega_1(1+\alpha)t} + e^{-j\omega_1(1+\alpha)t}) + (B/2)(e^{j\omega_2(1+\alpha)t} + e^{-j\omega_2(1+\alpha)t}), \quad (2)$$

where $\omega_1=2\pi f1$, $\omega_2=2\pi f2$, f1 and f2 are the pilot tone frequencies, A and B are the amplitudes of the respective pilot tone frequencies f1 and f2, and $\alpha$ is a frequency tolerance of ±10% (i.e., $-0.1 \leq \alpha \leq +0.1$). For each pilot tone frequency, a carrier is generated in the form of $$c(t)=e^{-j\omega t}=\cos \omega t - j \sin \omega t, \quad (3)$$

where $\omega$ is $\omega_1$ or $\omega_2$, as the case may be. The carrier for $\omega_1$ is mixed at 10 with the input signal to yield $$I(t)\cdot e^{-j\omega_1 t}=(A/2)\{e^{j\omega_1 t}+e^{-j\omega_1(2+\alpha)t}\}+(B/2)(e^{j[\omega_2(1+\alpha)-\omega_1]t}+e^{-j[\omega_2(1+\alpha)+\omega_1]t}), \quad (4)$$

for the f1 pilot-tone frequency. This signal is lowpass filtered at 12 to remove the $(A/2)(e^{-j\omega_1(2+\alpha)t})$ and $(B/2)(e^{j[\omega_2(1+\alpha)-\omega_1]t}+e^{-j[\omega_2(1+\alpha)+\omega_1]t})$ terms leaving $$I(t)\cdot e^{-\omega_1 t}=(A/2)(e^{j\omega_1 t}). \quad (5)$$

The square root of the absolute value of the result of equation 5 is derived at 14 resulting in a measure of the magnitude of amplitude A:

$$|(A/2)(e^{j\omega_1 t})| = \sqrt{(A^2/4)(\cos^2\alpha\omega_1 t + \sin^2\alpha\omega_1 t)} \quad (6)$$
$$= \sqrt{A^2/4}$$
$$= A/2.$$

It will be appreciated that the carrier for $\omega_2$ is mixed at 12 with the input signal to yield $I(t)\cdot e^{-j\omega_2 t}$ for the f2 pilot-tone frequency, which is processed as indicated in equations (5) and (6) to yield B/2, a measure of the magnitude of amplitude B.

A discrete-time formulation of the above equations is appropriate to the present case, and sets t=nT, where T is the sample interval (16 divided by 41.85 MHz) and n is a sample index. Consequently, the twice-f2 frequency (2·697.5 KHz= 1.395 MHz) will reflect around the half-Nyquist frequency (1.85 MHz divided by 32, which is 1.308 MHz) and alias to (1.308 MHz minus (1.395 MHz minus 1.308 MHz) which is 1.22 MHz, which is effectively removed by the digital lowpass filters in both f2 quadrature channels. The twice-f1 component lies within the Nyquist band, and hence is not subject to aliasing.

Figure 3:
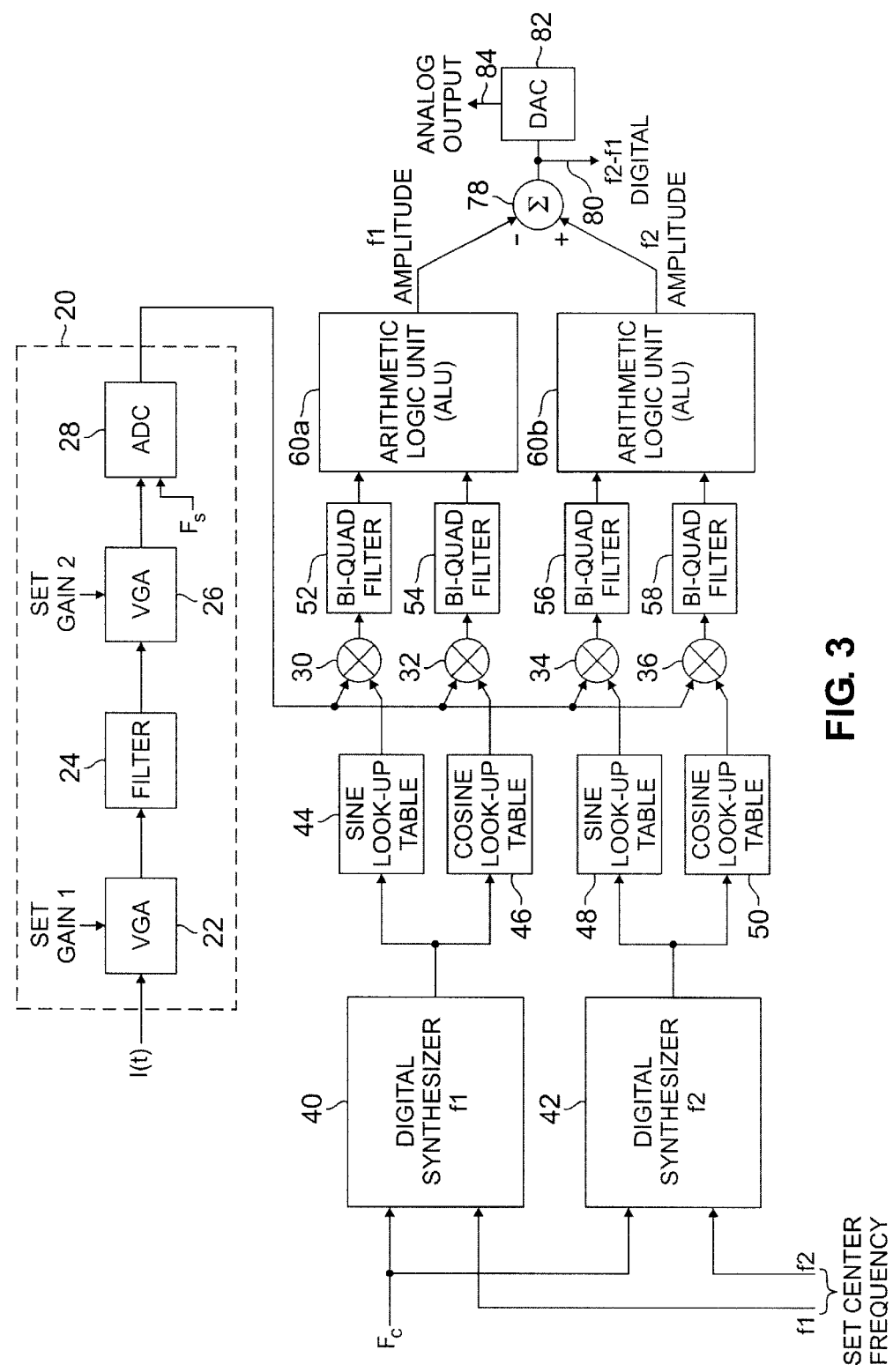
FIG. 3 is a block diagram of a circuit for digitally identifying pilot-tone amplitudes according to one embodiment of the present invention.

FIG. 3 is a diagram of a circuit for performing the determination of amplitude of the f1 and f2 tones. An analog portion 20 detects and digitizes the input signal I(t). The input signal is input to variable gain amplifier (VGA) 22 whose gain is established by a register (not shown). The analog signal is processed by a bandpass filter 24 and provided to variable gain amplifier 26 having a gain established by another register (not shown). The output signal, in the form of an analog signal, is provided to analog-to-digital converter 28 which is clocked by a sample frequency Fs, which is 1/16 (or some other suitable fraction) of the clock frequency (Fc). As will be evident below, the clock frequency is preferably 41.85 MHz in an exemplary embodiment, so the sample frequency is 2.616 MHz for a sample period of about 0.4 microseconds. Filter 24 serves to suppress signals that would unnecessarily interfere with the dynamic range of ADC 28, and acts as an anti-aliasing filter. The digital output of ADC 28 is provided as input to the digital portion of the circuit, shown in the lower portion of FIG. 3, and particularly to mixers 30, 32, 34 and 36.

Direct digital synthesizers 40 and 42 receive inputs representative of the actual pilot-tone frequencies f1 and f2, such as from the tape servo control microprocessor or from a frequency register of a data read channel that employs digital timing interpolation. The synthesizers are clocked by a clock signal Fc, preferably 41.85 MHz, to provide digital representations of the pilot-tone f1 and f2 frequencies, respectively. Each synthesizer includes an accumulator comprised of a register and an adder which periodically adds $\Delta\phi_f$ to the register. Each Fc sample cycle provides a sample period of about 24 nanoseconds, during which the count in the register is advanced by an amount ($\Delta\phi_f$) proportional to the pilot-tone frequency. The incremental count $\Delta\phi_f$ added to each accumulator in synthesizers 40 and 42 in each clock period can be represented by $2^N \cdot f/Fc$, where N is the accumulator length in bits, f is the pilot tone frequency and Fc is the clock frequency. Consequently, a nominal frequency of 465 KHz is represented by the decimal value 728 so that the value in the accumulator of synthesizer 40 increases by decimal 728 during each 24 nanosecond clock period. The amount of the increase of the accumulated count during each 0.4 microsecond sample period determines the slope of the ramp for f1. When the value of the accumulated count reaches the maximum value ($2^{16}-1$), the accumulated count rolls over to zero and additional accumulation is added to zero, thereby operations as a modulo $2^N$ accumulator. Hence, synthesizer 40 produces a sawtooth waveform comprising a series of ramps whose average period as the ramp traverses the range of the accumulator is representative of the f1 pilot-tone frequency. Similarly, the incremental count $\Delta\phi_f$ for f2 at the nominal frequency of 697.5 KHz is represented by the decimal value 1092. Synthesizer 42 produces a sawtooth waveform comprising a series of ramps whose average period as the ramp traverses the range of the accumulator is representative of the frequency of the f2 pilot-tone. Moreover, the incremental count added to the accumulator each clock period for pilot-tone f1 will vary by about decimal ±4 for each ±0.5% change in f1 frequency as the f1 pilot-tone varies over the tolerance range of ±10% between 418.5 and 511.5 KHz. Similarly, the incremental count added to the accumulator each clock period for pilot-tone f2 will vary by about decimal ±5 for each ±0.5% change in f2 frequency as the f2 pilot-tone varies over the tolerance range of ±10% between 627.75 and 767.25 KHz.

The output of synthesizer 40 is a digital ramp whose period is representative of the f1 pilot-tone frequency and the output of synthesizer 42 is a digital ramp whose period is representative of the f2 pilot-tone frequency. In both cases, the ramps can be scaled and viewed as executing excursions between a minimum value of zero and a maximum value of $2\pi$, as is known in the digital synthesizer art. Look-up tables 44–50 contain digitized representations of sine and cosine functions that are addressed and retrieved based on the instantaneous values of the digital ramp for the respective f1 and f2 pilot-tone frequencies. Because the six least significant bits of the count accumulated in synthesizers 40 and 42 provide little distinguishing value, only the ten most significant bits of the instantaneous values accumulated in the synthesizers are forwarded to look-up tables 44, 46, 48 and 50.

In the first embodiment of the invention, look-up tables 44, 46, 48 and 50 are memories containing the sine and cosine values over an input phase range corresponding to zero to $2\pi$, as described above. Using the ramp values from synthesizers 40 and 42 as addresses, tables 44–50 retrieve and output digital representations of the sine and cosine values of signals f1 and f2, respectively, for each sampled phase angle $\phi$ over the $2\pi$ cycle of the sample period. The outputs are 8-bit representations of those functions and are provided to the respective mixer 30, 32, 34 and 36. Hence, the output of look-up table 44 is a digital representation of the sine function for the f1 pilot-tone frequency identified in equation 3 over the $2\pi$ cycle of the sample period, and the output of look-up table 46 is a digital representation of the cosine function for the pilot-tone frequency f1 over the $2\pi$ cycle. Similarly, the outputs of tables 48 and 50 are the digital representations of the sine and cosine functions for the pilot-tone frequency f2.

Each table 44–50 provides an 8-bit output representative of the sine or cosine function of the f1 or f2 pilot-tone. Since the sawtooth ramps supplied to the tables are digitized to ten bits, each table must have a capacity of $2^{10} \times 8$ bits, or 8192 bits. The data stored in look-up tables 44–50 can be compressed several ways, well known in the art. One straightforward technique is to simply store values for only one quadrant, $0 \le \phi \le \pi/2$, in each table, and selectively switch the input and output polarities to map the other three quadrants. This technique reduces the size of each table to $2^8 \times 7$ bits (1792 bits). Another technique is to store the difference between the input ramp and the sine (or cosine) output function, rather than the sine (or cosine) function alone. This technique saves an additional two bits and reduces each table to 1280 bits, but requires an additional 7-bit adder. Other data compression techniques may be used, such as coarse/fine interpolation, etc.

The 8-bit sine or cosine outputs from look-up tables 44–50 are mixed with the input signal from analog-to-digital converter 18 by mixers 30, 32, 34 and 36 (which act as multipliers), resulting in digital representations of the signals represented by equation 4. These signals are individually filtered by bi-quadratic filters 52, 54, 56 and 58 and provided to identical arithmetic logic units 60a and 60b which determine the root sum of the squares for each of the respective f1 and f2 signal amplitudes. Filters 52, 54, 56 and 58 are lowpass filters which reject the sum component arising from the mixing operation, with two filters in the f1 channel and two filters in the f2 channel assigned to the sine and cosine functions of each frequency. The result is a digital representation of the signals represented by equation 5. (The effects of tolerance $\alpha$ are largely removed due to suitable choice by the servo control microprocessor of the input to synthesizers 40 and 42.) Arithmetic logic unit 60a mathematically squares the digital values from filters 52 and 54, sums the values for the f1 representations, and mathematically determines the square-root of the result, which yields a baseband (DC) component of the signal that is representative of the amplitude of the f1 signal in the input signal. Similarly, arithmetic logic unit 60b mathematically squares the digital values from filters 56 and 58, sums the values for the f2 representations, and mathematically determines the square-root of the result, which yields a baseband (DC) component of the signal that is representative of the amplitude of the f2 signal in the input signal.

Figure 4:
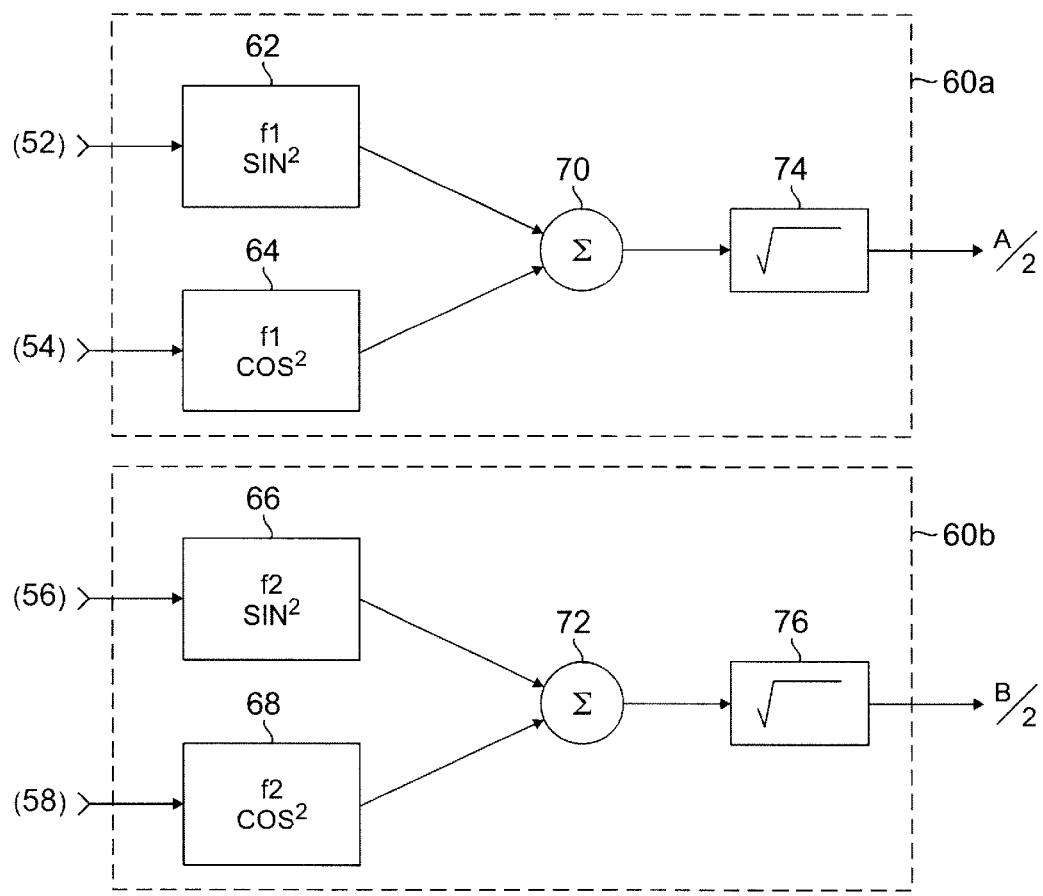
FIG. 4 is a block diagram of the arithmetic logic units for the circuit of FIG. 3

FIG. 4 illustrates the details of arithmetic logic units 60a and 60b. Digital squaring logics 62, 64, 66 and 68 square the signals received from respective filters 52, 54, 56 and 58. The outputs of squaring logics 62 and 64 are added by digital summing logic 70 and the outputs of squaring logics 66 and 68 are added by digital summing logic 72. The square-root of the output of summing logic 70 is derived by square-root logic 74 and the square-root of the output of summing logic 72 is derived by square-root logic 76. The results of logics 74 and 76 are digital representations of the amplitude of the pilot-tone frequencies f1 and f2, respectively, in the input signal. More precisely, the digital representation outputs from logics 74 and 76 represent one-half the amplitude of the pilot-tone frequencies.

As shown in FIG. 3, the outputs of arithmetic logic units 60a and 60b are provided to difference circuit 78 which subtracts the output of square root logic 74 from the output from square root logic 76, and left shifts the digital result one place to multiply by decimal 2 (binary 10). The output, which is representative of the difference in amplitude between f1 and f2 is supplied digitally at output 80, and through digital-to-analog converter 82 in analog form at output 84.

Synthesizers 40a and 40b, look-up tables 44, 46, 48 and 50, mixers 30, 32, 34 and 36, bi-quad filters 52, 54, 56 and 58 and arithmetic logic units 60a and 60b jointly implement a digital tuned bandpass filter in each channel, having a passband established by filters 52, 54, 56 and 58 and a center frequency established by the frequency delivered to synthesizers 40 and 42. By implementing this filter digitally as described above, the center frequency and passband are able to be defined with extremely high resolution, which improves the overall performance of the servo control system as it operates to position the head appropriately with respect to the recording medium.

Figure 5:
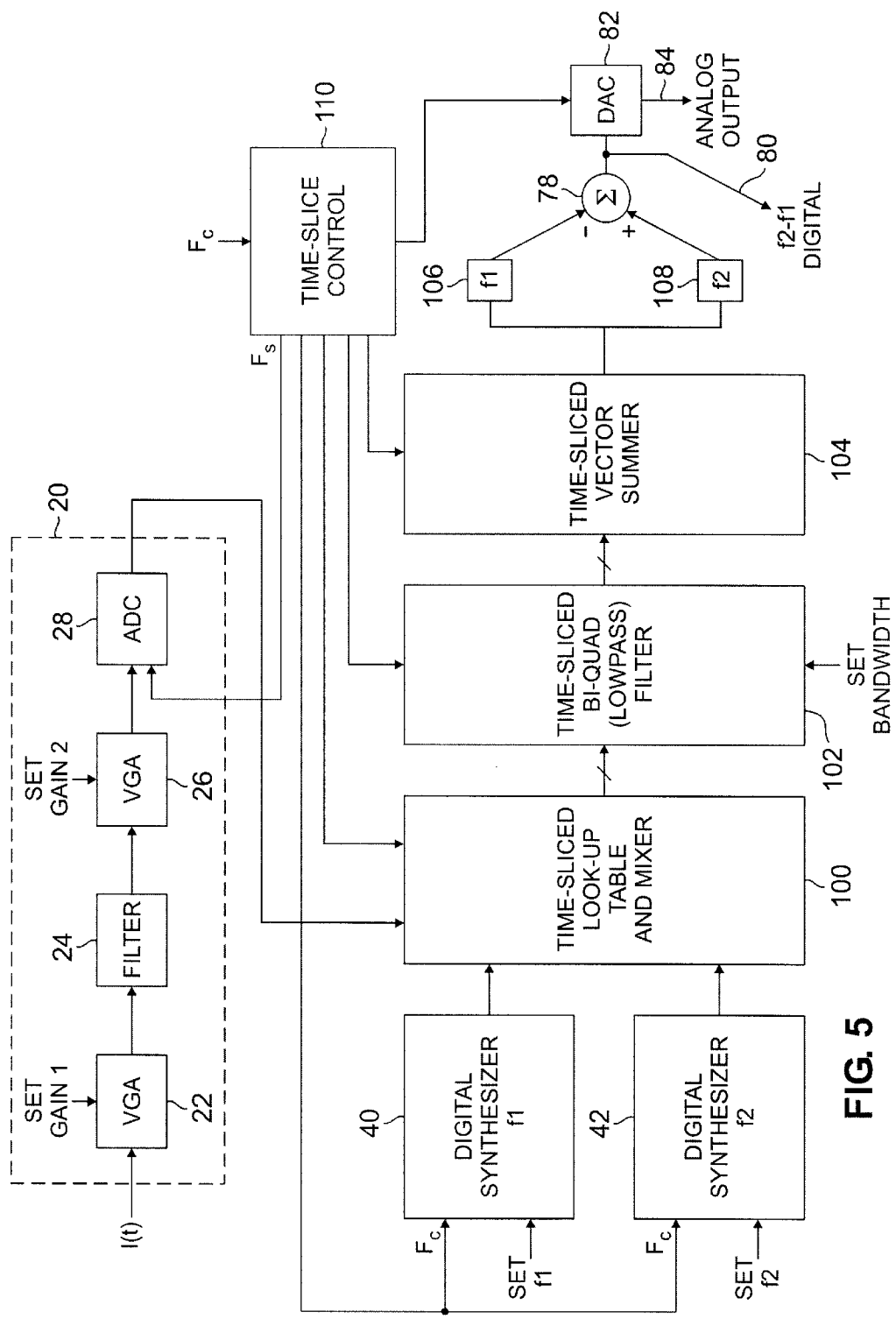
FIG. 5 is a block diagram of a circuit for digitally identifying pilot-tone amplitudes according to a second, preferred embodiment of the present invention.

FIG. 5 is a block diagram of the preferred time-sliced implementation of the present invention. The analog portion 20 and synthesizers 40 and 42 are identical to analog portion 20 and synthesizers 40 and 42 shown in FIG. 3. In this version of the invention, the output from digital-to-analog converter 28 is provided as an input to time-sliced look-up table and mixer 100 which receives the digital representations of ramp functions representing the actual f1 and f2 pilot-tone frequencies. Table and mixer 100 provides an output to time-sliced lowpass bi-quad filter 102, provides an output representative of the filtered sine and cosine functions of f1 and f2 to time-sliced vector-summer 104. The bandwidth of bi-quad filter 102 can in one embodiment be established by a register set by the servo controller. Vector-summer 104 provides digital outputs representative of the f1 and f2 amplitudes through buffers 106 and 108 to summer 78, as previously described. Time-sliced control 110 receives the clock signal Fc and provides the sample signal Fs to analog-to-digital converter 28 as well as control and timing signals to synthesizer 100, filter 102, vector summer 104, and buffers 106 and 108.

Figure 6:
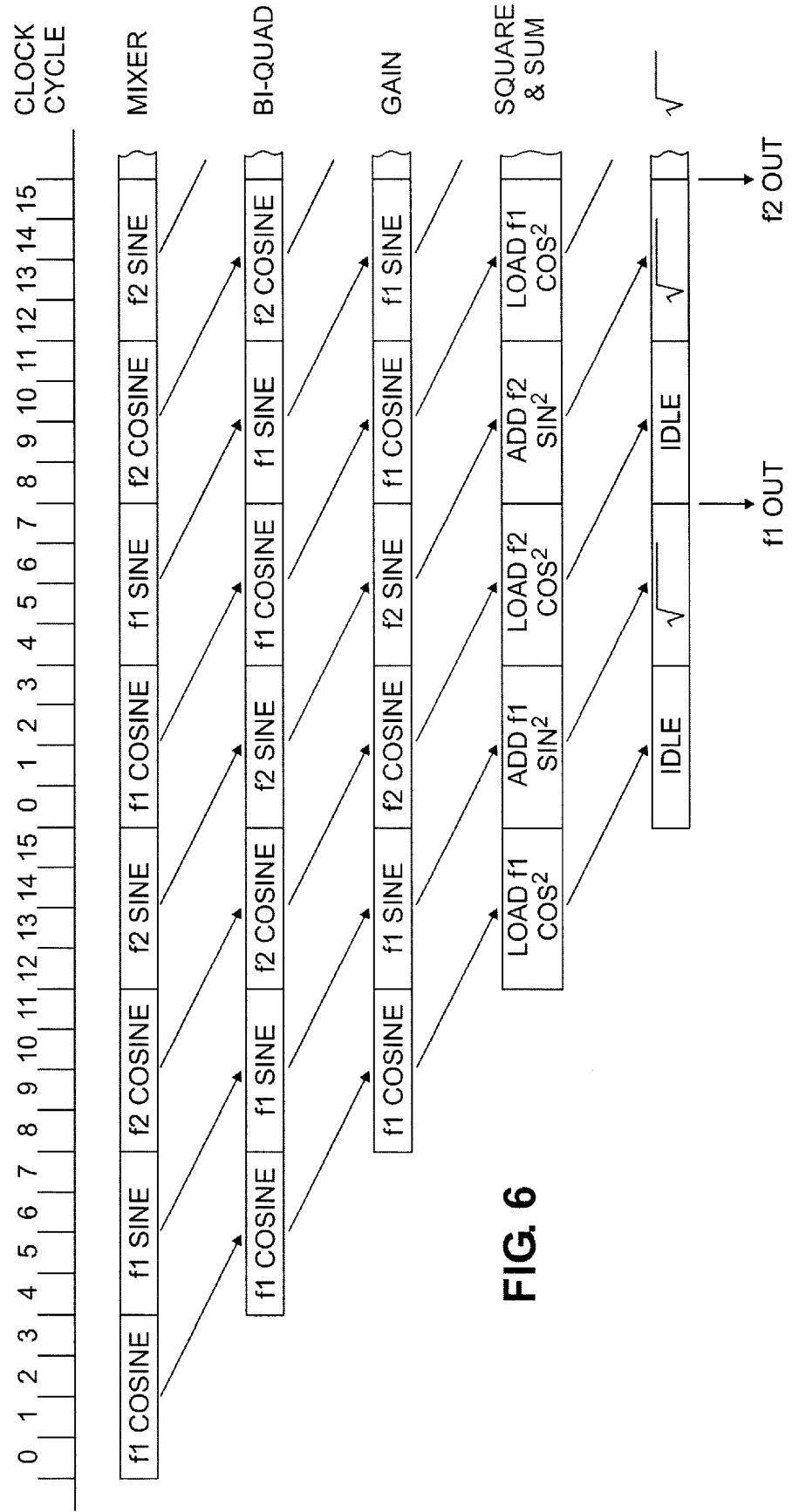
FIG. 6 is a diagram illustrating the control of the circuit illustrated in FIG. 5 for pipelining the processing of digital detection of pilot-tone amplitudes.

Operation of the circuit illustrated in FIG. 5 may best be explained with reference to the timing diagram of FIG. 6 which illustrates one exemplary version of the control and pipeline timing for the embodiment of FIG. 5. FIG. 6 illustrates the operation of the circuit during two sample periods, each containing 16 clock cycles. Since the clock signal has a frequency of 41.85 MHz, the sample cycles have a frequency of about 2.616 Mhz, and each sample period is approximately 0.4 microseconds in duration. This sample period is the time interval allotted for each block in FIG. 5 to perform its assigned function.

Time-sliced look-up table and mixer 100 operates in a manner quite similar to look-up tables 44, 46, 48 and 50, and mixers 30, 32 and 34 of FIG. 3, except that table and mixer 100 operates during separate portions of the sample period to process the sine and cosine functions of the f1 and f2 center frequencies. Thus, table and mixer 100 receives and computes the f1 cosine function and mixes the result with the input signal from analog-to-digital converter 28 during clock cycles 0–3 to provide an output to time-sliced biquad filter 102. Similarly, LUT and mixer 100 processes the f1 sine function during clock cycles 4–7, the f2 cosine function during clock cycles 8–11, and the f2 sine function during the clock cycles 12–15. The look-up table is a single table having a capacity of $2^{10} \times 8$ bits, or 8192 bits. Using data compression techniques as previously described, the look-up table may be reduced to as small as 1792 bits or even smaller.

As illustrated in FIG. 6, the time-sliced biquad filter processes the f1 cosine function during clock cycles 4–7, processes the f1 sine function during clock cycles 8–11, processes the f2 cosine function during clock cycles 12–15, and processes the f2 sine function during clock cycles 0–3 of the next sample period. If an optional gain is used, it is staged into the pipeline at this point, employing four clock cycles. Provision of f1 or f2 channel-dependent gain may be advantageous to compensate inherent differences in the amplitude of the f1 or f2 tone when the head is centrally positioned over the f0 track. During clock cycles 12–15, the (f1 cosine)$^2$ function is derived and loaded in the vector-summer logic 104. During clock cycles 0–3 of the next sample period, the (f1 sine)$^2$ function is derived and added to the (f2 cosine)$^2$ function in the vector-summer logic 104.

Similarly, the (f2 cosine)$^2$ function is loaded during the clock cycles 4–7 of the second sample period and the (f2 sine)$^2$ function is added to the (f2 cosine)$^2$ function during clock cycles 8–11 of the second sample period. Vector-summer 104 calculates the square root of the sum of the (f1 cosine)$^2$ and (f1 sine)$^2$ functions simultaneously with the loading of the (f2 cosine)$^2$ function during the clock cycles 4–7 of the second sample period to output a digital representation of the f1 amplitude at clock period 8. Similarly, vector-summer 104 calculates the square root of the sum of the (f2 cosine)$^2$ and (f2 sine)$^2$ functions simultaneously with the loading of the (f1 cosine)$^2$ function during the clock cycles 12–15 of the second sample period to output a digital representation of the f2 amplitude at clock period 0 of the third sample period. The square root operation is implemented in one exemplary embodiment as a cellular array as generally described in *Computer Arithmetic: Principles, Architecture and Design* by K. Hwang, New York: John Wiley, 1979, pp. 360–366. As illustrated in FIG. 5, the f1 and f2 functions are loaded into buffers 106 and 108 under the control of time-sliced control 110 and the difference is determined at difference circuit 78 for output at 80, as previously described.

FIG. 6 is only one example of the control and pipelining of the time-sliced embodiment illustrated in FIG. 5. More particularly, as previously mentioned, boosting the gain of the various functions subsequent to processing by the bi-quad filters may not be necessary, in which case the loading and adding of the squared functions maybe accomplished immediately following operation of the bi-quad filter, thereby shifting the outputs to four clock cycles earlier. As a result, the f1 and f2 outputs would occur following the third and eleventh clock cycles in the second sample period. Likewise, some vector processing operations permit simultaneous loading and summing of the squared functions so the last two steps illustrated in FIG. 6 can be combined so the f1 and f2 outputs may be derived four clock cycles earlier, as early as the beginning of the 0 and 8 clock cycles of the second sample period.

Although the apparatus has been described in FIG. 6 in conjunction with sixteen clock cycles for each sample period, resulting in a sample period of approximately 0.4 microseconds, it may be possible, in some cases, to reduce the number of clock cycles for each step of the process to three, thereby requiring twelve clock cycles for each sample period. Reduction of the number of clock cycles to twelve for a sample period, results in reduction of the sample period to approximately 0.3 microseconds.

Figure 7:
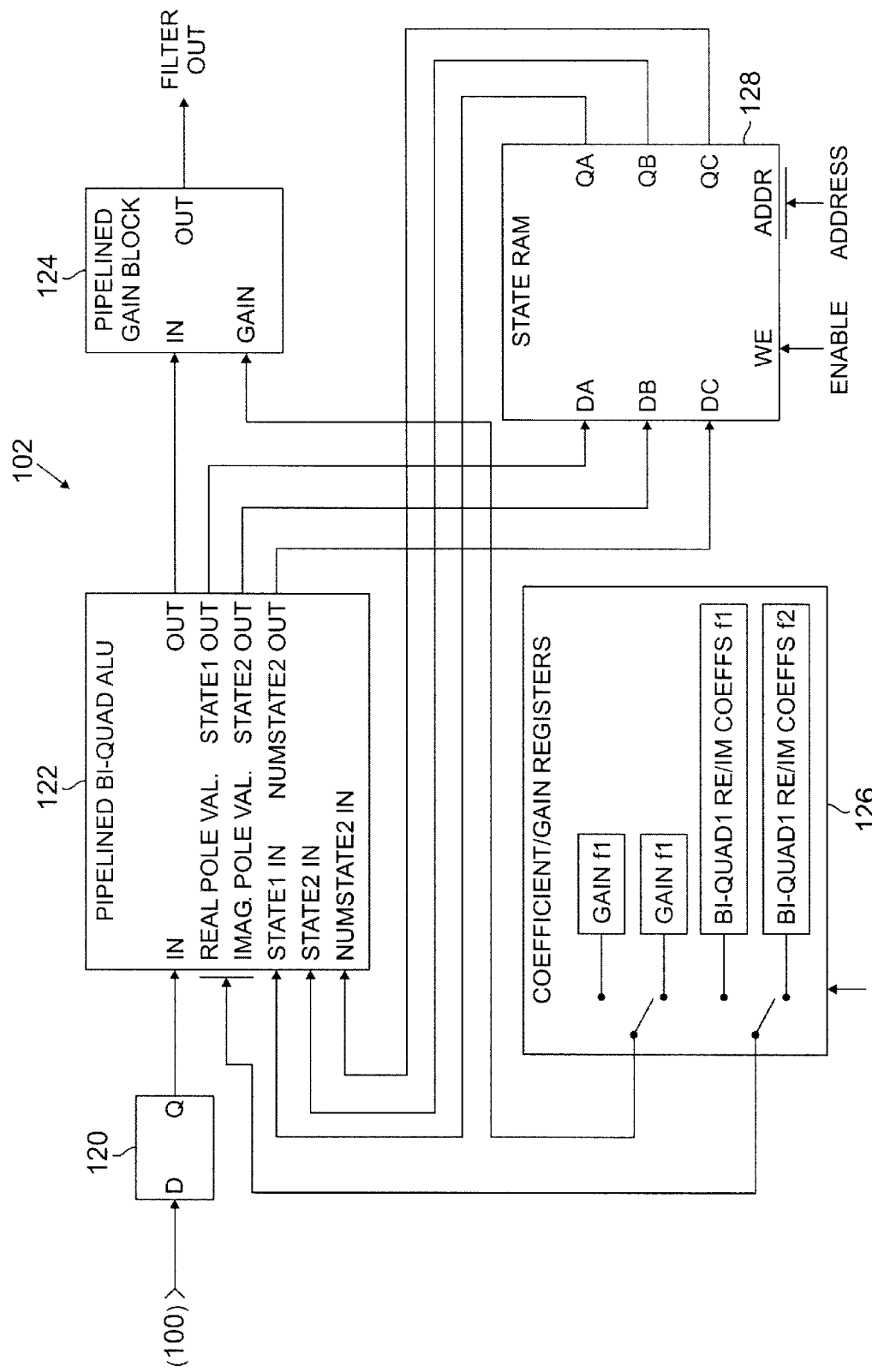
FIG. 7 is a block diagram of the time-sliced bi-quad filter utilized in the circuit illustrated in FIG. 5.

FIG. 7 is a block diagram of time-sliced bi-quad filter 102 utilized in the circuit illustrated in FIG. 5. Time-sliced bi-quad filter 102 includes register 120 comprised of one or more D flip-flops for coupling the output of time-sliced look-up table and mixer 100 to the input of pipelined bi-quad arithmetic logic unit (ALU) 122. The output of ALU 122 is connected to the input of pipelined gain block 124. ALU 122 has a REALPOLEVAL input and an IMAGPOLEVAL input receiving real and imaginary coefficients from coefficient/gain register block 126, and gain block 124 has a GAIN input receiving a programmed gain amount from coefficient/gain register block 126 as well. The real and imaginary coefficients in coefficient/gain register block 126 are predetermined based on the desired filter cutoff frequency. Coefficient/gain registers 126 are controlled by a time-slice control input from the serial port to provide appropriate gain and coefficient values for each of the f1 and f2 channels. State RAM 128 is a 4 by 3 word memory that is provided to store the states of ALU 122 as the circuit operates. State storage is required, since each of the four filter channels must remember its state for the previous sample of that channel. The STATE1OUT output of ALU 122 is connected to the DA input of RAM 128, the STATE2OUT output of ALU 122 is connected to the DB input of RAM 128, and the NUMSTATE2OUT output of ALU 122 is connected to the DC output of RAM 128. The QA output of RAM 128 is connected to the STATE1IN input of ALU 122, the QB output of RAM 128 is connected to the STATE2IN input of ALU 122, and the QC output of RAM 128 is connected to the NUMSTATE2IN input of ALU 122. The output of time-sliced bi-quad filter 102 is the output of gain block 124.

Figure 8:
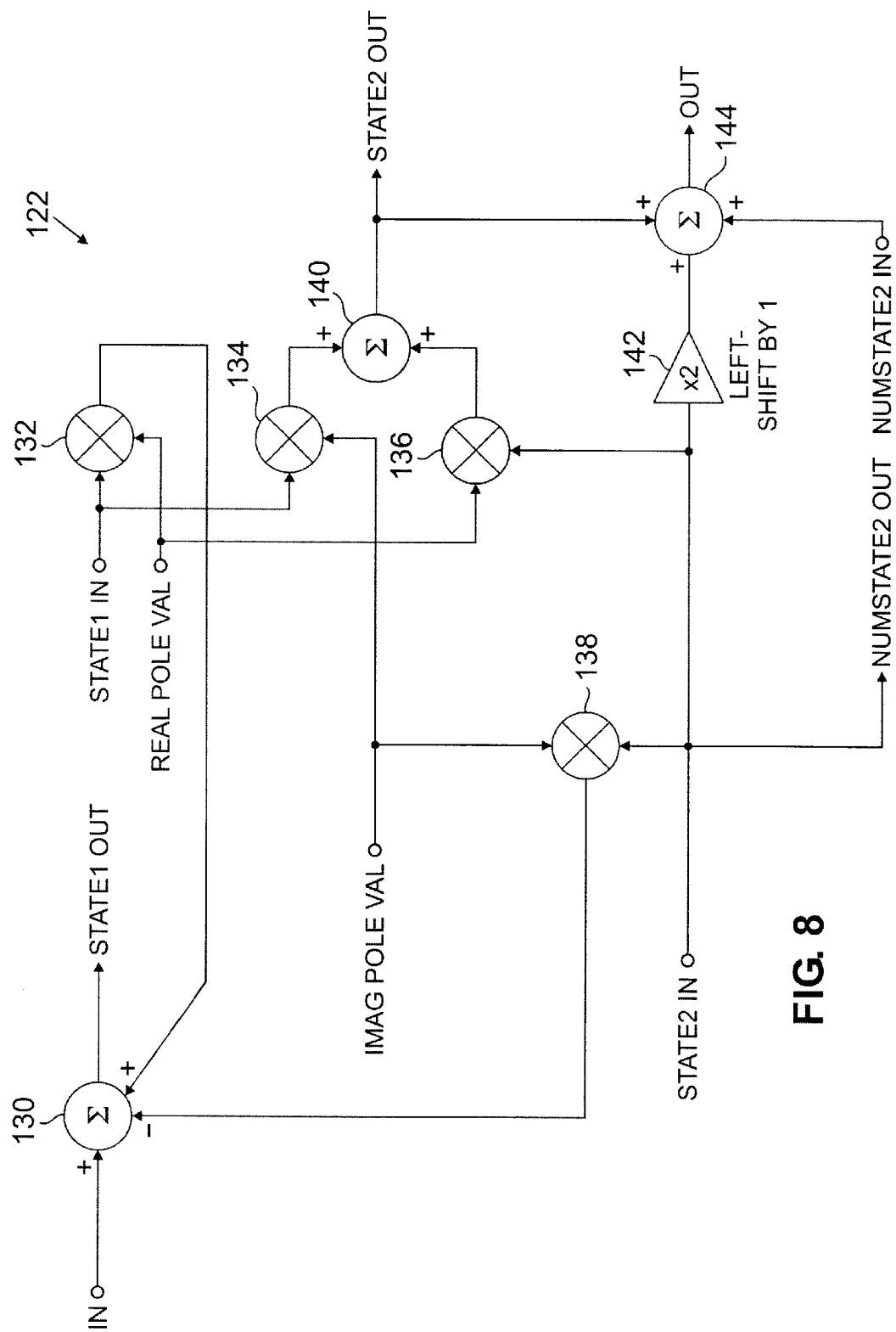
FIG. 8 is a diagram illustrating the operation of the arithmetic logic unit (ALU) of the time-sliced bi-quad filter shown in FIG. 7.

FIG. 8 is a diagram illustrating the operation of ALU 122 of time-sliced bi-quad filter 102 shown in FIG. 7. The STATE1IN input and the REALPOLVAL input to ALU 122 are input to multiplier 132, and the STATE1IN input and the IMAGPOLEVAL input to ALU 122 are also input to multiplier 134. The STATE2IN input and the REALPOLVAL input to ALU 122 are input to multiplier 136, and the STATE2IN input and the IMAGPOLVAL input to ALU 122 are also input to multiplier 138. The output of multiplier 132 is added to and the output of multiplier 138 is subtracted from the IN input to ALU 122 at summer 130, yielding the STATE1OUT output of ALU 122. The outputs of multipliers 134 and 136 are added together at summer 140, yielding the STATE2OUT output of ALU 122. The STATE2IN input to ALU 122 is simply passed through as the NUMSTATE2OUT output. The STATE2IN input is also left-shifted by one bit at block 142, and the output of block 142 is added to the STATE2OUT output and the NUMSTATE2IN input to yield the OUT output of ALU 122. Thus, the configurations shown in FIGS. 7 and 8 are employed to realize time-sliced bi-quad filter 102 as shown in FIG. 5, operating in the manner shown in FIG. 6. Word widths within the filter are best determined by simulation, taking into account roundoff noise and the desired precision. In general, data path widths within the filter will vary, as is known in the art.

The time-sliced version of the invention described in connection with FIGS. 5–8 time shares among four channels the functions of signal mixers, the bi-quad filters, and the arithmetic unit, by means of pipelining and time-sharing techniques. Accordingly, nearly a four-fold reduction in the hardware volume is achieved relative to the first embodiment of the invention.

The apparatus and process of the present invention provide digital representations of the pilot-tone amplitudes for direct application to the digital servo system. The invention facilitates dynamic changes in pilot-tones, as well as provides a stable and cost-effective implementation of digital processing detection and processing of pilot-tones. It will be clear to those skilled in the art that the invention is operable with any number of pilot tones, and also may be interconnected with either a conventional read channel variable frequency oscillator (VFO) or with the frequency control register of a channel using the known technique of interpolated timing recovery.

Although the present invention has been described with reference to preferred embodiments, workers skilled in the art will recognize that changes may be made in form and detail without departing from the spirit and scope of the invention.

What is claimed is:

1. A process for digitally representing an amplitude of each of at least two pilot tone signals having mutually exclusive frequencies, the at least two signals indicating a relative position of a servo controlled device and being part of an input signal set whose amplitude is represented in an input digital representation, the process comprising:

deriving a digital representation of a frequency of each of the at least two signals;

deriving a digital representation of a sine function and of a cosine function of the frequency of each of the at least two signals based on the digital representations of frequency;

mixing the digital representations of each of the sine and cosine functions of the frequency of each of the at least two signals with the input digital representation to derive digital representations of sine and cosine components of each of the at least two signals; and processing the digital representations of the sine and cosine functions of each of the at least two signals to derive a digital representation of the amplitude of each of the at least two signals.

2. The process of claim 1, wherein the at least two signals comprise first and second signals, and the process further includes subtracting a digital representation of an amplitude of the first signal from a digital representation of an amplitude of the second signal to derive a digital representation of a difference between the amplitudes of the first and second signals.

3. The process of claim 1, wherein the digital representation of the frequency of each of the at least two signals is derived by establishing a number representative of the respective frequency and repeatedly advancing a count in an accumulator by the number to establish a digital ramp traversing a full phase range having a period representative of the frequency.

4. The process of claim 3, wherein the number equals $2^N \cdot f/Fc$, where N is a capacity in bits of the accumulator, f is the frequency of the respective one of the at least two signals, and Fc is a clock frequency of the advance of count in the accumulator.

5. The process of claim 4, wherein a value off is established by digital interpolation of the respective frequency from a data read channel.

6. The process of claim 1, wherein the digital representations of the sine function and of the cosine function of the frequency of each of the at least two signals are stored in a look-up table and are derived by retrieving the representations from the look-up table based on the digital representation of the frequency of the respective one of the at least two signals.

7. The process of claim 6, wherein the digital representation of the frequency of each of the at least two signals is derived by establishing a number representative of the respective frequency and repeatedly advancing a count in an accumulator by the number to establish a digital ramp traversing a full phase range having a period representative of the frequency, the advance in count in the accumulator occurring over a sample period, the look-up table providing a respective sine or cosine value for a phase angle of the respective frequency based on an instantaneous value of the count in the accumulator.

8. The process of claim 1, wherein the sine function of each of the at least two signals is a digital representation of $\{X \sin(ft)\}$ and the cosine function of each of the at least two signals is a digital representation of $\{X \cos(ft)\}$, where X is an amplitude of a respective one of the at least two signals and f is a frequency of a respective one of the at least two signals, and wherein the digital representation of the amplitude of each of the at least two signals is derived by:

squaring the digital representations of each of the sine and cosine functions of the respective signal;

summing the squared digital representations of the respective signal; and deriving a square-root of the sum of the squared digital representations of the respective signal.

9. The process of claim 1, wherein the at least two signals comprise a first and a second pilot-tone signal, the process further comprising:

establishing a plurality of consecutive sample periods, the step of deriving digital representations of the frequencies of the first and second signals being performed during each of the sample periods, each of the sample periods having four portions; and time-slicing the steps of deriving the digital representations of the sine and cosine functions, mixing and processing.

10. The process of claim 9, wherein the time-slicing includes:

deriving a digital representation of the cosine function of the first signal during a first portion of a sample period;

deriving a digital representation of the sine function of the first signal during a second portion of the sample period;

deriving a digital representation of the cosine function of the second signal during a third portion of the sample period; and deriving a digital representation of the sine function of the second signal during a fourth portion of the sample period.

11. The process of claim 10, wherein the time-slicing further includes:

defining, during mutually exclusive portions of the sample periods, a mathematical square of the digital representation of the cosine and sine functions of the first and second signals;

summing, during mutually exclusive portions of sample periods, a sum of the mathematical squares of the cosine and sine functions of the first signal and a sum of the mathematical squares of the cosine and sine functions of the second signal; and deriving, during mutually exclusive portions of sample periods, a mathematical square-root of the sum of the squares of the cosine and sine functions of the first signal and a mathematical square-root of the sum of the squares of the cosine and sine functions of the second signal.

12. The process of claim 11, wherein the summing of the mathematical squares of the cosine and sine functions of the first signal is performed during the same portion of a sample period that the second of the cosine and sine functions is defined for the first signal, and the summing of the mathematical squares of the cosine and sine functions of the second signal is performed during the same portion of a sample period that the second of the cosine and sine functions is defined for the second signal.

13. The process of claim 11, wherein the mathematical square-root of the sum of the squares of the cosine and sine functions of the first signal is derived during a portion of the sample period following a portion during which the cosine and sine functions of the first signal were summed, and the mathematical square-root of the sum of the squares of the cosine and sine functions of the second signal is derived during a portion of the sample period following a portion during which the cosine and sine functions of the second signal were summed.

14. Apparatus for digitally representing the amplitude of each of at least two pilot tone signals having mutually exclusive frequencies, the at least two signals indicating a relative position of a servo controlled device and being part of an input signal set whose amplitude is represented in an input digital representation, the apparatus comprising:

a processor responsive to the frequencies of the at least two signals for deriving a digital representation of the sine and cosine functions of the frequency of each of the at least two signals, the processor including:

a synthesizer for receiving signals at the frequencies of the at least two signals for deriving a digital representation of the frequency of each of the at least two signals; and a look-up table containing digital representations of a sine and a cosine function for the frequencies of the at least two signals, the look-up table being responsive to the synthesizer to select the digital representation of the sine and cosine functions for each of the at least two signals based on the digital representations of the frequency of each of the at least two signals; and means responsive to the selected digital representations of the sine and cosine functions for each of the at least two signals and to the input digital representation for deriving a digital representation of the amplitude of each of the at least two signals.

15. The apparatus of claim 14, wherein the means for deriving comprises a logic unit responsive to the selected digital representations of the sine and cosine functions for each of the at least two signals and to the input digital representation to derive a first digital representation for each of the at least two signals based on the sine function of each of the at least two signals and a second digital representation for each of the at least two signals based on the cosine function of each of the at least two signals, and to derive a digital representation of the amplitude of each of the at least two signals based on the first and second digital representations for each of the at least two signals.

16. The apparatus of claim 15, wherein the logic means includes:

at least four bi-quadratic filters, a first of the filters passing a representation of the amplitude of a sine function of a first selected of the at least two signals, a second of the filters passing a representation of the amplitude of a cosine function of the first signal, a third of the filters passing a representation of the amplitude of a sine function of a second of the at least two signals, and a fourth of the filters passing a representation of the amplitude of a cosine function of the second signal;

a first arithmetic unit responsive to the first and second filters for deriving a digital representation of the square-root of the sum of the squares of the representations of the amplitudes of the sine and cosine functions of the first signal; and a second arithmetic unit responsive to the third and fourth filters for deriving a digital representation of the square-root of the sum of the squares of the representations of the amplitudes of the sine and cosine functions of the second signal.

17. The apparatus of claim 16, further including a difference logic responsive to the first and second arithmetic units for deriving a difference between the digital representations of the amplitudes of the first and second signals.

18. The apparatus of claim 15, further including a difference logic responsive to the logic unit for deriving a difference between the digital representations of the amplitudes of the first and second signals.

19. The apparatus of claim 15, wherein the sine function of each of the at least two signals is a digital representation of {X sin(ft)} and the cosine function of each of the at least two signals is a digital representation of {X cos(ft)}, where X is the amplitude of the respective one of the at least two signals and f is the frequency of the respective one of the at least two signals, the logic unit comprising:

squaring apparatus for squaring the digital representations of each of the sine and cosine functions of the respective signal, summing apparatus for summing the squared digital representations of the respective signal, and square-root apparatus for deriving the square-root of the sum of the squared digital representations of the respective signal.

20. The apparatus of claim 15, including a time-sharing control unit for operating the processor and logic unit.

21. The apparatus of claim 14, wherein the synthesizer is responsive to of the frequency of each of the at least two signals to establish a number representative of the respective frequency, the synthesizer including an accumulator having a count that is advanced by the number to establish a digital ramp traversing a full phase range having a period representative of the frequency.

22. The apparatus of claim 21, wherein the accumulator has a capacity of N bits, and the number equals $2^N \cdot f/Fc$, where f is the frequency of the respective one of the at least two signals, and Fc is a clock frequency of the advance of count in the accumulator.

23. The apparatus of claim 22, wherein a value of f is established by digital interpolation of the respective frequency from a data read channel.

24. The apparatus of claim 22, wherein the look-up table is responsive to the instantaneous count in the accumulator to provide a respective sine or cosine value for a phase angle of the respective frequency.

25. Apparatus for digitally representing the amplitude of each of at least two pilot tone signals having mutually exclusive frequencies, the at least two signals indicating a relative position of a servo controlled device and being part of an input signal set whose amplitude is represented in an input digital representation, the apparatus comprising:

a synthesizer for receiving signals at the frequencies of the at least two signals for deriving a digital representation of the frequency of each of the at least two signals; and a look-up table containing digital representations of a sine and a cosine function for the frequencies of the at least two signals, the look-up table being responsive to the synthesizer to select the digital representation of the sine and cosine functions for each of the at least two signals based on the digital representations of the frequency of each of the at least two signals; and a time-shared bi-quadratic filter responsive to the selected digital representations of the sine and cosine functions for each of the at least two signals and to the input digital representation to derive a first digital representation for each of the at least two signals based on the sine function of each of the at least two signals and a second digital representation for each of the at least two signals based on the cosine function of each of the at least two signals, and to derive a digital representation of the amplitude of each of the at least two signals based on the first and second digital representations for each of the at least two signals.

26. A process for digitally representing amplitudes of first and second pilot tone signals having mutually exclusive frequencies, the amplitudes of the first and second pilot tone signals indicating a relative position of a servo controlled device and being part of an input signals set whose amplitude is represented in an input digital representation, the process comprising:

deriving a digital representation of a frequency of the first pilot tone signal;

deriving a digital representation of a frequency of the second pilot tone signal;

deriving a digital representation of a sine function and a cosine function of the frequency of the first pilot tone signal based on the digital representation of the frequency of the first pilot tone signal;

deriving a digital representation of a sine function and a cosine function of the frequency of the second pilot tone signal based on the digital representation of the frequency of the second pilot tone signal;

mixing the digital representation of the sine and cosine functions of the frequency of the first pilot tone signal with the input digital representation to derive a digital representation of a sine component and a cosine component of the first pilot tone signal;

mixing the digital representation of the sine and cosine functions of the frequency of the second pilot tone signal with the input digital representation to derive a digital representation of a sine component and a cosine component of the second pilot tone signal;

processing the digital representation of the sine and cosine components of the first pilot tone signal to derive a digital representation of an amplitude of the first pilot tone signal; and processing the digital representation of the sine and cosine components of the second pilot tone signal to derive a digital representation of an amplitude of the second pilot tone signal.

\* \* \* \* \*

UNITED STATES PATENT AND TRADEMARK OFFICE
CERTIFICATE OF CORRECTION

PATENT NO. : 6,590,733 B1
DATED : July 8, 2003
INVENTOR(S) : Rosser S. Wilson et al.

It is certified that error appears in the above-identified patent and that said Letters Patent is hereby corrected as shown below:

<u>Column 8,</u>
Line 29, delete "maybe", insert -- may be --
Line 31, delete "shiffing", insert -- shifting --

<u>Column 10,</u>
Line 37, delete "off", insert -- of f --

Signed and Sealed this

Twenty-eighth Day of October, 2003

JAMES E. ROGAN
*Director of the United States Patent and Trademark Office*